Figure 1:
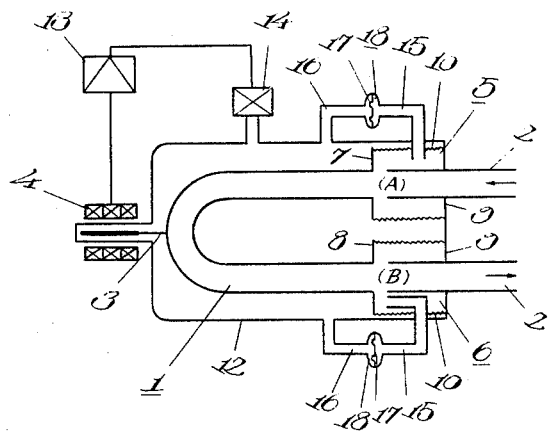

United States Patent

[11] 3,584,508

| [72] | Inventor | Kamekichi Shiba<br>No. 159, Kagacho, Bonkyo-ku, Tokyo, Japan |
|---|---|---|
| [21] | Appl. No. | 743,199 |
| [22] | Filed | July 8, 1968 |
| [45] | Patented | June 15, 1971<br>Continuation-in-part of application Ser. No. 500,666, Oct. 22, 1965, now Patent No. 3,429,181. |

[54] FLOW METER
6 Claims, 5 Drawing Figs.

| [52] | U.S. Cl. | 73/194 |
|---|---|---|
| [51] | Int. Cl. | G01j 1/00 |
| [50] | Field of Search | 73/228, 194 M, 232 |

[56] References Cited

UNITED STATES PATENTS

| 2,538,785 | 1/1951 | Karig | 73/116 |
|---|---|---|---|
| 2,804,771 | 9/1957 | Brown | 73/228 |
| 3,096,646 | 7/1963 | Pierce | 73/228 |
| 3,138,955 | 6/1964 | Uttley | 73/228 |

FOREIGN PATENTS

| 1,157,475 | 5/1958 | France | |
|---|---|---|---|

Primary Examiner—James J. Gill
Assistant Examiner—J. W. Halen
Attorney—Michael S. Striker ABSTRACT: The flow meter of the present invention, viz, a movable U-tube flow meter of the present invention is a hydrodynamical one not based on the Bernouilli's theorem and hence it enables the measurement of a flow rate regardless of viscosity losses. The main movable U-tube is connected to fixed inlet and outlet tubes by suitable joints and all of these parts are preferably enclosed in a sealed housing. The pressure of the fluid outside of the main movable tube is so regulated that the tube is kept in its position of zero flow rate. The flow rate is calculated from the measured values of the difference of pressure at the inlet end and the outside of the main movable tube together with the difference of pressure at the outlet end and the outside of the main movable tube, provided the sectional areas of the inlet and outlet ends and the effective areas of the joints are known.

INVENTOR
KAMEKICHI SHIBA

BY Michael S. Striker
ATTORNEY 3,584,508

1

FLOW METER

The present application is a continuation-in-part application of the copending application Ser. No. 500,666 filed Oct. 22, 1965 and now U.S. Pat. No. 3,429,181.

BACKGROUND OF THE INVENTION

The present invention relates to a flow meter, and more particularly to a flow meter provided with one or more movable U-tubes. In a flow meter in which flow of fluid passing through a conduit is obtained by measuring the pressure of the fluid, the working hypothesis of such meter is based on the Bernouilli's theorem. However, Bernouilli's theorem is inapplicable to a considerable number of cases for instance to cases in which the viscosity of the fluid is not negligible, though said theorem is indisputable when it is demonstrated by the principle of the conservation of energy particularly in the field of dynamics.

The present invention provides a flow meter which can measure the amount of flow of a fluid by employing a movable U-tube even in a case where the Bernouilli's theorem is inapplicable. In cases where the Bernouilli's theorem is applicable the construction of the meter according to the present invention can be made much simpler than in those cases where the theorem can not be applied.

In the light of all kinds of energy the law on conservation of energy holds true without exception, but when the energy is limited to dynamic energy as when the Bernouilli's theorem is proved, the law of conservation of energy does not hold true when thermal energy is related, and therefore in the case when the viscosity of fluid can not be ignored, the Bernouilli's theorem is inapplicable. On the other hand, the law of conservation of momentum based on the law of motion holds true within the scope of Newton's dynamics without exceptions and the law of conservation of momentum is the law wherein, "the increase of momentum of particles in an infinitesimal time $dt$ is equal to $dt$ times the resultant of external force which are received by the particles," and the flow meter according to the present invention is based on said law of conservation of momentum.

Since the flow meter according to the present invention is also a flow meter by means of which the correct amount of flow of a noncompressible fluid in constant flow is measured as in conventional flow meters, this assumption is taken into account in the description of of the flow meter according to the present invention hereinbelow.

The working hypothesis of the present invention is explained hereinafter.

The present invention flow meter comprises a movable main tube having two paralleled straight inlet and outlet portions through which fluid flows respectively in opposite direction and a bent tubular portion connecting the inlet and outlet tube portion said movable main tube being movable in the axial direction of the straight inlet and outlet tube portions fixed tubes respectively communicating with the openings of the inlet and outlet tube portion by elastic joints, and means detecting the displacement of the movable main tube. The inlet straight and outlet tube portions and the bent tubular portion connecting these two straight tube portions are preferably made integral. The movable main tube may be in the form of a U-tube. The cross-sectional area of the inlet opening of the movable main tube might be equal or different to that of the outlet opening thereof. The joints movably connecting the main tube to the fixed tubes may be any of the conventional types and preferably in the form of bellows.

1. The forces exerted on the fluid in the movable main tube are the forces $\Phi_A, \Phi_B$ given by the pressures at the inlet opening $A$ and outlet opening $B$ of the movable main tube, the force $f$ given by said tube and its own gravity. When the pressures exerted respectively on the inlet opening $A$ having its cross-sectional area $S_A$ and the outlet opening $B$ of the cross-sectional area $S_B$ are $P_A$ and $P_B$, the above force $\Phi_A$ and $\Phi_B$ are expressed by the following equations, in which the direction of flow of fluid is made as positive.

$$\Phi_A = -S_A P_A, \qquad \Phi_B = -S_B P_B$$

The gravity working on the fluid in the tube is $V\rho g'$, in which $V$ represents the capacity of the tube, $\rho$ the density of the fluid and $g'$ the component of acceleration of gravity in the flow direction.

The whole forces working on the fluid in the movable main tube are expressed as follows:

$$-S_A P_A - S_B P_B + f + V\rho g'$$

2. Whereas, the increase of momentum the fluid obtains in the tube in an infinitesimal time $dt$ is as explained hereinafter. The inside of the main tube being always in a constant moving state, while the fluid within the main tube is being successively replaced, there is no change in momentum. At the inlet opening $A$ of the main tube, however, since a mass is flowing into the main tube with the fluid of $\rho Q dt$ (where $Q$ is the volumic amount of flow) at an average speed of $V_A$, it becomes that momentum in the extent of amount $\rho \ QV_A dt$ flows into the main tube, and similarly momentum in the extent of amount of $\rho Q V_B dt$ (where $V_B$ is the average speed of flow at the outlet opening B) flows out of the outlet opening. Thereby it will be known that there is the increase of momentum in the extent of amount of $\rho Q(V_B - V_A) dt$ during $dt$.

With the formulations in the above paragraphs (1) and (2) and in view of the law of conservation of momentum, following equation is established.

$$-S_A P_A - S_B P_B + f + \rho g' A \times \rho Q(V_B + V_A)$$

And since the fluid to be measured by the present invention meter is a steady flow of incompressible fluid, following equation of continuity establishes.

$$Q = S_A V = S_B V_B$$

$V_A = Q/S_A$, $V_B = Q/S_B$ obtained from the above equation of continuity are put into the foregoing equation, and the following equation is obtained.

$$-S_A P_A - S_B P_B + f + V\rho' = \rho^2(1/S_B + 1/S_A) \qquad (I)$$

The main tube being stationary when the resultant of forces received thereby is zero. Therefore, the forces received by the main tube are a force $-f$ (the reaction of force $f$) from the fluid flowing therethrough, a force $\Phi_{\mu}$ due to a pressure received by additional pressure recipient surfaces attached to the main tube, gravity, and force $F$ for maintaining the main tube in balance (this force may be the resilient force of the universal joints or a force imparted by any other means including bellows or the resultant of these forces). Said force $_{\mu}$ is expressed by the following equation, in which $S_A^*$ and $S_B^*$ each represents the area of auxiliary pressure receiving surfaces provided to both openings of the movable main tube and $P$ the pressure outside the main tube $$\Phi_{\mu} = -S_A P_A - S_B^* P_B + (S_A^* + S_A)P + (S_B^* + S_B) P$$

Since the gravity on the mass $\mu$ is $\mu g'$, the conditions for keeping the movable main tube in balance are formulated by the following equation (II).

$$-f - S_A^* P_A - S_B^* + (S_A^* + S_A)P + (S_B^* + S_B)P + g' + = 0 \qquad (II)$$

From the above equations (I) and (II) following equation (III) is obtained.

$$-(S_A^* + S_A)(P_A - P) - (S_B + S_B)(P_B - P) + (\mu + V\rho)g' + F$$
$$= \rho Q^2(1/S_B + 1/S_A) \qquad (III)$$

When the joints used in the present meter are bellows, following substitutions may be introduced into the above equation.

$$S_A^* + aS_A = S'_A, \qquad S_B^* + S_B = S'_B$$

The values expressed in the above will correspond to the effective area of each bellows. It will be noted that the above equation (III) illustrates the principal working hypothesis of meters in accordance with the present invention. The flux of fluid $Q$ is, therefore, obtainable in principle from said equation (III) by measuring three factors thereof, viz, two pressure differences thereof $(P_A-P)$, $(P_B-P)$ and force $F$ thereof.

It is preferable to provide the present meter either in a horizontal direction or vertical direction, though it is workable even in a place other than the above two directions.

a. In case of the meter being located horizontally: In this instance where $g'=0$, the equation (III) becomes as follows:

$$-S'_A(P_A-P)-S'_B(P_B-P)+F=\rho Q^2(1/S_B+1/S_A) \quad (IV)$$

b. In case of the meter being located vertically: In this instance where $g'=\pm g$, the equation is rewritten as follows, in which the downward direction of flow is expressed as positive.

$$-S'_A(P_A-P)-S'_B(P_B-P)\pm(\mu+\rho)g+F=\rho^2(1/S_B+1/S_A) \quad (V)$$

When the $(\mu+V\rho)g$ is considered to be constant, the force $F$ is expressed as follows:

$$F=P(\mu+V\rho)g+F'$$

And the above equation (V) is rewritten into the following which is consistent with the equation (IV) in their formulations.

With the above-explained working hypothesis, the present invention meter is further explained with reference to some preferable embodiments thereof illustrated in the accompanying drawing.

In the accompanying drawing;

FIGS. 1 to 5 show meters provided with one or more movable U-tubes in accordance with the present invention.

Figure 3:
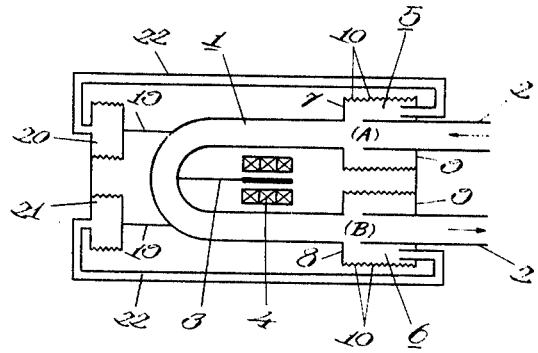
Figure 5:
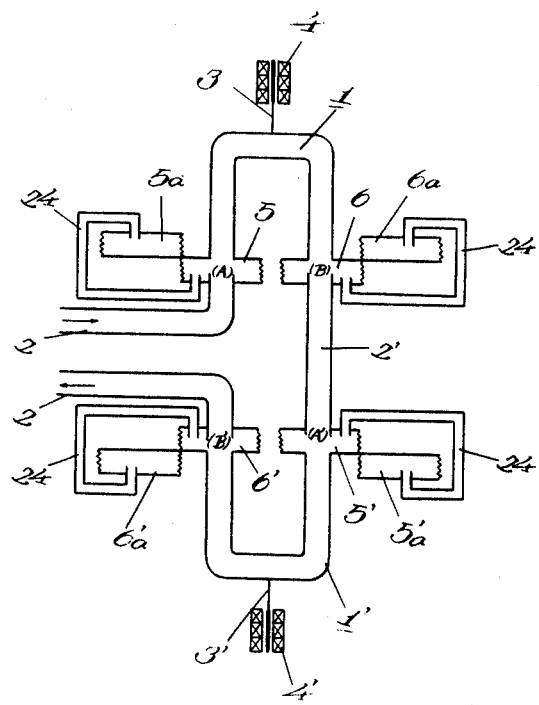

A movable main tube 1 is U-shaped and has openings $A$ and $B$ at its both ends. The opening $A$ faces the free opening end of a fixed inlet tube 2 with a space therebetween, and the opening $B$ faces to the free opening end of a fixed outlet tube 2. A movable detecting rod 3, one end of which is fitted to the foremost part of the U-shaped movable main tube 1, is inserted into a differential detector 4 at its other free end. Universal joint means 5 and 6 such as a bellows or springs which connect the openings $A$ and $B$ of the movable main tube 1 to the fixed tubes 2 allow said main tube 1 to be displaced along its longitudinal axis. In FIGS. 1, 3 and 5, said universal joint means 5 and 6 annularly enclose the openings $A$ and $B$ of the main movable tube 1, that is, elastic tubular bodies 10, 10 fluid tightly connect annular flanges 7 and 8 of the main tube 1 and annular flanges 9, 9 of the fixed tubes 2, 2. Said flanges 7 and 8 have respective cross-sectional area $S_A^*$, $S_B^*$.

Figure 2:
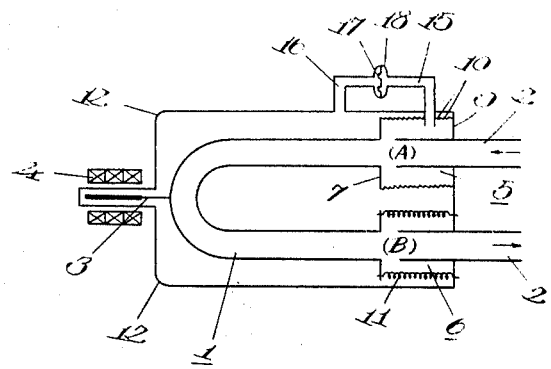
Figure 4:
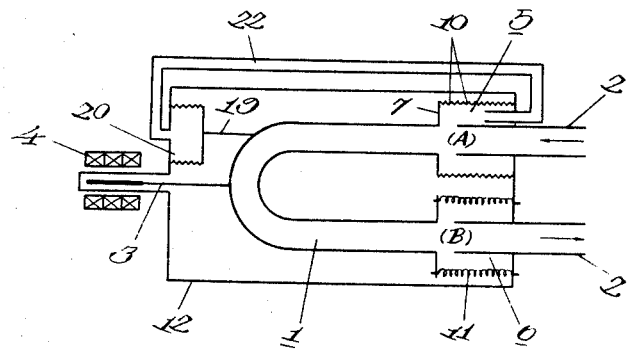

In FIGS. 2 and 4, one of the universal joint means 5 has the same structure as the above-described tubular body 10, whereas the other joint means consist of a porous bellows or coil springs connecting the outlet opening $B$ of the movable main tube 1 and the fixed tube 2 in a nonfluidtight manner.

EXAMPLE 1

In the flow meter of the present invention illustrated in FIG. 1, in order to make the external force $F$ exerted on the movable main tube 1 zero, the movable main tube 1, the universal joint means 5, 6 and the movable detecting rod 3 are contained in a sealed housing 12. The pressure in the sealed housing 12 is adjusted so that the displacement of the movable main tube 1 is kept nil, by amplifying through an amplifier 13 the displacement value of the main tube 1 detected by the differential transformer 4 and transmitting the displacement value thus amplified to a pressure regulator 14 such as a pump communicating with the interior of the sealed housing 12. One end of pressure-difference detecting pipes 15, 15 having its other end opening to the inside of the universal joint means 5 or 6 is connected to pipes 16, 16 which transfer the pressure in the sealed housing 12, by means of a pressure-difference-detecting device 18, 18, each having a diaphragm 17, whereby the pressure difference between the pressure $Po$ in the sealed housing 12 and that $P_A$ at the inlet opening $A$ of the movable main tube 1 or that $P_B$ at the outlet opening $B$ of said tube, that is, the pressure difference $(P_A-Po)$ and $(P_B-Po)$ is obtainable.

When the fluid stays stationary and the external and internal pressure of the movable tube 1 are balanced, to wit, $Q=0$ and $P=P_A=P_B$, the tube 1 is considered to be in its original position. When the fluid passes through the tube 1, the meter operates. Provided that the external pressure on the tube 1 in the sealed housing is $Po$, the equation (IV) will read as follows, in which $F=0$.

$$-S'_A(P_A A/P_o)-S'_B(P_B=P_o)=\rho Q^2(1/S_B+1/S_A)$$

Since the pressure-difference-detecting device 18, 18 can detect $(P_A-P_o)$, $(P_B-Po)$ in the above equation, flow of the fluid $Q$ is obtainable from the above equation.

EXAMPLE 2

In the meter in accordance with the present invention which is illustrated in FIG. 2, the one illustrated in FIG. 1 is modified. That is, one of the universal joint means is replaced by an elastic body 11 such as a coil spring and the pressure $P_B$ at the outlet opening $B$ of the main tube 1 is led to the inside of the sealed housing 12 so that the pressure in the sealed housing becomes equal to the pressure $P_B$ at the outlet opening of the main tube 1. In this construction, the pressure regulator 14 and the pressure-difference-detecting device 18 in the meter of FIG. 1 are eliminated, resulting in a simplified meter. In this meter, the equation (IV) reads as follows:

$$-S'_A(P_A A/P_B)+F=\rho a Q^2(1/S_B+1/S_A) \quad (VII)$$

The flow of fluid $Q$ is, therefore, obtainable from the above equation by measuring the pressure difference $(P_A-P_B)$ by the pressure-difference-detecting device 18 and the force $F$ by the differential transformer 4.

EXAMPLE 3

In FIG. 3, a pair of connecting rods 19, 19 fitted to the forward part of the movable main tube 1 are connected at their other ends to the respective free ends of auxiliary universal joint means 20, 21 such as bellows. The universal joint means 5 communicating with the inlet opening $A$ of the tube 1 is connected to the corresponding auxiliary universal joint means 20 by a connecting tube 22, while the other universal joint means 6 is connected to its corresponding other auxiliary universal joint mean 21 by another connecting pipe 22. The effective area of each universal joint means and its corresponding auxiliary universal joint means are kept equal so that the pressure exerted on the outlet and inlet openings $A$ and $B$ may equally be sustained by them. In this meter, the force $F$ includes the force of the pressure in the auxiliary universal joint means 20 and 21, viz, $S'_A(P_A-P)+S'_B(P_B-P)$, and be represented by the following equation.

$$F=S'_A(PAA-P)+S'A_B(P_B-P)+F^*$$

In this equation, $F^*$ is the elastic force the four universal joint means 5,6,20 and 21 and proportional to the displacement of the movable main tube 1. The equation (IV) will read as follows:

$$F^*=\rho Q^2(1/S_B+1/S_A) \quad (VIII)$$

Hence, the flow of fluid can be obtained by solely measuring the force $F^*$ by the differential detector 4.

EXAMPLE 4

In FIG. 4, the structure illustrated in FIG. 2 and that in FIG. 3 are combined to provide another embodiment of the present invention meter. The movable main tube 1 related to the fixed tubes 2, 2 is enclosed into the sealed housing 12. The universal joint means 5 provided at the inlet opening $A$ of the main tube 1 and the auxiliary universal joint means 20 connected by the connecting rod 19 to the forward part of the main tube 1 are connected to each other by the connecting tube 22, so that the pressure at the inlet opening may be sustained in the joint means 20. The outlet opening B communicates with the interior of the sealed housing 12, since the former is fitted to the latter by an open joint such as a coil spring. In the flow meter in this example, the equation (IV) becomes the equation (VIII) which is given in the example 3. The flow of fluid is, therefore, obtainable by solely measuring the elastic force $F^*$ of two joint means 5 and 20 by means of the differential transformer 4.

EXAMPLE 5

When the Bernouilli's theorem is applicable, that is when the fluid passing through the meter is not viscous, and when, $S_A=S_B=S$ and consequently $P_A=P_B$, the equation (IV) is converted as follows:

$$-(S'_A+S_B)(P_A-P)+F=2lS\rho Q^2 \qquad (IX)$$

The flow of fluid is, therefore, obtainable by measuring the pressure difference $(P_A-P)$ and the force $F$ by means of the flow meter described with reference to FIG. 2. If the pressure outside the movable main tube 1 is made equal to $P_B(=P_A)$ as in the aforementioned example 2, the equation (VI) becomes converted as follows:

$$F=2lS\rho Q^2 \qquad (X)$$

The flow of fluid $Q$ can easily be obtained by measuring solely the force $F$.

EXAMPLE 6

In FIG. 5, a pair of movable U-tubes are used to provide a novel mass flow meter. Two U-shaped movable main tubes 1, 1' are placed so as to oppose each other in a vertical direction. The outlet opening $B$ of the tube 1 is connected to the inlet opening $A'$ of the tube 1' by a fixed tube 2' which is connected to the tubes 1 and 1' respectively by universal joints 6 and 5'. To the inlet opening $A$ of the tube 1 connected is a fixed tube 2 by a joint 5, and to the outlet opening $B'$ of the tube 1' connected is a fixed tube 2 by a joint 6'. The fluid to be measured by the meter flows through the inlet opening $A$, the movable main tube 1, the universal joint means 6, the fixed tube 2', another universal joint means 5', the another movable main tube 1', the outlet opening $B'$ of the main tube 1', the universal joint means 6', and finally the fixed tube 2. Each of auxiliary joint means 5a, 6a, 5'a, 6'a is fitted respectively to the movable end of the joint means 5, 6, 5', 6'. Each pair of the joint means 5, 6, 5', 6' and their corresponding auxiliary joint means 5a, 6a, 5'a, 6'a are respectively connected by connecting tubes 24, so that the fluid pressures acting at the joint means 5, 5' at the inlet openings $A$ and $A'$ of the movable tubes 1 and 1' and those at acting at the joint means 6, 6' the outlet openings $B$ and $B'$ thereof are compensated by the pressure acting on the auxiliary joint means 5a, 5'a, respectively 6a, 6a'.

When the force required to balance the upper movable main tube 1 is represented by $F_1$, and the force required to balance the lower movable main tube 1' is represented by $F_2$, the following is established, in which the flow in a vertically downward direction is expressed as positive.

$$(\mu+V\rho)g+F_1=2lS\rho A^2, \qquad (\mu+VAn)g+F_2=2lS\rho Q^2$$

Following two equations are reduced from the above equations.

$$F_1+F_2=A4lS\rho Q^2 \qquad (XI)$$

$$F_2-F_1=2(\mu+V\rho)g \qquad (XII)$$

The mass flux of fluid $Q$ is, therefore, obtainable from the following equation $$\rho Q=\sqrt{\frac{S}{4V}(F_1+F_2)\left\{\frac{F_2-F_1}{2g}-\mu\right\}} \qquad (XIII)$$

The concrete value of the mass flux of fluid $\rho Q$ is measured in the above equation (XIII) by detecting the amount of the force $F_1$ and $F_2$ by means of the pressure difference detector 4, 4' each having the movable detecting rods 3, 3'.

While the present invention has been described in the above with reference to certain embodiments thereof, it should be noted that the scope of the invention is not limited to the embodiments.

The remarkably advantageous effects of the present invention flow meter are summarized hereinafter.

i. Since the working hypothesis of the present meter is indisputable, the absolute measurement of flow of fluid is obtainable. To wit, the measured value by the present meter is reliable without referring to those obtained by other flow meters.

ii. The flow of fluid is measured without referring to the Bernouilli's theorem.

iii. The structures of the present meter can be made much simpler than conventional flow meters, when the Bernouilli's theorem is applicable.

iv. When a pair of the present meters are connected in parallel, a mass flow of fluid is obtainable thereby.

v. A flow meter for measuring a large amount of flow can be produced.

What I claim is:

1. A flow meter comprising a fluid-filled, fluidtight housing; at least one movable U-shaped tube mounted within indication housing and having an inlet and an outlet end and radially outwardly extending flanges at said ends, one surface of said flanges being in contact with said fluid; a fixed inlet tube and a fixed outlet tube having respectively open ends substantially aligned with and spaced from said inlet and said outlet ends of said movable U-shaped tube for feeding the fluid to be measured into and out of the latter; a pair of resilient joint means respectively connecting said fixed tubes to the outer periphery of said outwardly extending flanges, said inlet joint means being fluidtight and defining with its flange a pressure chamber so that the movable tube will tend to move in one direction in response to momentum changes of the fluid passing through the interior thereof and under the influence of the fluid pressure acting on said flanges; means to communicate the pressure of the measured fluid at said outlet end with the fluid in said housing, whereby the fluid pressure on said inlet flange will provide pressure compensation; counteracting means for providing a force counteracting the tendency of said movable tube to move in said one direction; and means for measuring said force as an indication of the amount of measured fluid flowing through the meter.

2. A flow meter as defined in claim 1, wherein said counteracting means comprise an iron core fixed to said tube for movement therewith and a stationary coil surrounding said core, and means for transmitting a force proportional to the pressure in said pressure chamber to said movable tube in a direction opposite to said one direction.

3. A flow meter as defined in claim 2, wherein only said resilient inlet joint means is fluidtight and the other is constituted by spring means opposing movement of said movable tube in said one direction and permitting passage of fluid between the respective end of the movable tube and that of the corresponding fixed tube into said housing, and wherein said force transmitting means comprise tube means communicating at one end with said pressure chamber formed by said one fluidtight joint means and at the other end with said fluidtight housing and a flexible membrane extending transverse through said tube means intermediate the ends thereof.

4. A flow meter as defined in claim 2, wherein only said resilient inlet joint means is fluidtight and the other is constituted by spring means opposing movement of said movable tube in said one direction and permitting passage of fluid between the respective end of the movable tube and that of the corresponding fixed tube into said housing, and wherein said force transmitting means comprise an auxiliary resilient fluidtight joint means in said housing connected at one end to said movable tube for movement therewith and a tube communicating at opposite ends with said one and said auxiliary fluidtight joint means.

5. A flow meter comprising a fluid-filled, fluidtight housing; at least one movable U-shaped tube mounted within said housing and having an inlet and an outlet end and radially outwardly extending flanges at said ends, one surface of the flanges being in contact with the fluid; a fixed inlet tube and a fixed outlet tube having respectively open ends substantially aligned with and spaced from said inlet and outlet ends of said movable tube for feeding the fluid to be measured into and out of the latter; a pair of resilient joint means respectively connecting said fixed tubes to the outer periphery of said outwardly extending flanges, both of said joint means being fluidtight and defining with the respective flange a pressure chamber so that the movable tube will tend to move in one direction in response to momentum changes of the fluid passing through the interior thereof and under the influence of the fluid pressure acting on said flanges; means for sensing the movement of said tube; pump means responsive to said sensing means for maintaining a pressure in said housing which acts upon said flanges and tends to prevent movement of said movable tube; and means for sensing the pressure differences between the fluid in said housing and the measured fluid inlet pressure and between the fluid in said housing and the measured fluid outlet pressure as an indication of the fluid flow.

6. A flow meter as defined in claim 5, and wherein said pressure difference sensing means comprise a pair of tube means each communicating at one end with the pressure chamber formed by the respective fluidtight joint means and at the other end with the interior of said housing, and a flexible membrane extending transversely through each of said tube means intermediate the ends thereof.